(12) United States Patent
Sasaki et al.

(10) Patent No.: US 8,988,449 B2
(45) Date of Patent: Mar. 24, 2015

(54) IMAGE PROCESSING APPARATUS AND IMAGE PROCESSING METHOD

(75) Inventors: Yoshitaka Sasaki, Kawasaki (JP); Satoru Torii, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 13/594,018

(22) Filed: Aug. 24, 2012

(65) Prior Publication Data
US 2013/0069970 A1  Mar. 21, 2013

(30) Foreign Application Priority Data
Sep. 15, 2011 (JP) .................................. 2011-202333

(51) Int. Cl.
*G06T 15/00* (2011.01)
*G06T 15/06* (2011.01)
*G09G 5/02* (2006.01)

(52) U.S. Cl.
CPC . *G06T 15/06* (2013.01); *G09G 5/02* (2013.01)
USPC ........... 345/589; 345/419; 345/426; 382/167; 348/231.3

(58) Field of Classification Search
CPC ................................... G09G 5/02; G06T 15/06
USPC ......... 345/419, 426, 589; 382/167; 348/231.3
See application file for complete search history.

(56) References Cited

U.S. PATENT DOCUMENTS

| 6,678,407 | B1 * | 1/2004 | Tajima .......................... 382/167 |
| 6,788,812 | B1 * | 9/2004 | Wilkins ........................ 382/167 |
| 6,885,370 | B2 * | 4/2005 | Abramov et al. ............. 345/426 |
| 7,580,063 | B2 * | 8/2009 | Makioka .................... 348/231.3 |
| 7,983,481 | B2 * | 7/2011 | Shimbaru ..................... 382/167 |
| 8,559,710 | B2 * | 10/2013 | Sasaki .......................... 382/167 |
| 2009/0067711 | A1 | 3/2009 | Sasaki |

FOREIGN PATENT DOCUMENTS

JP  2001-184522  7/2001

* cited by examiner

*Primary Examiner* — Phu K Nguyen
(74) *Attorney, Agent, or Firm* — Fitzpatrick, Cella, Harper & Scinto

(57) ABSTRACT

Light source characteristic data representing the spectral characteristics and light distribution characteristics of a light source which illuminates a scene is input. Object characteristic data representing the spectral property of an object contained in the scene is input. Ray tracing is performed for respective rays having different wavelengths. A spectral radiance in each pixel of a computer graphics image representing the scene is calculated based on the light source characteristic data and the object characteristic data. The color signal values of each pixel are calculated from the spectral radiance in the each pixel, and the computer graphics image of the scene is generated.

14 Claims, 13 Drawing Sheets

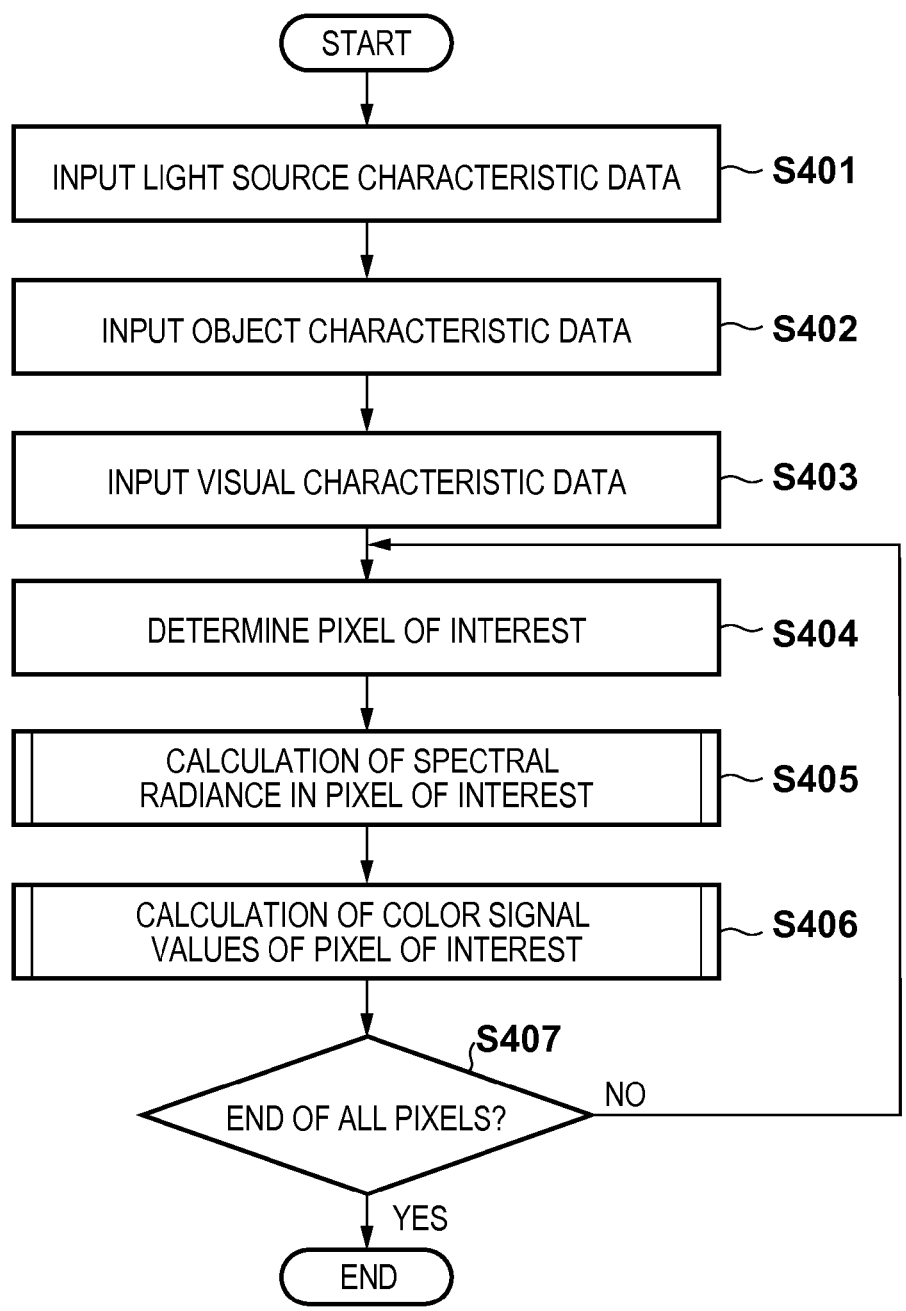

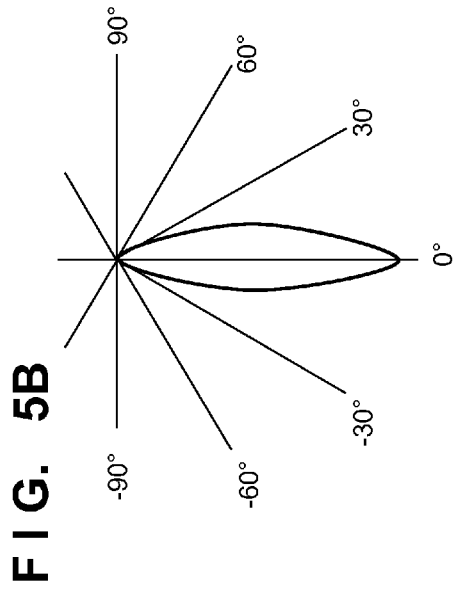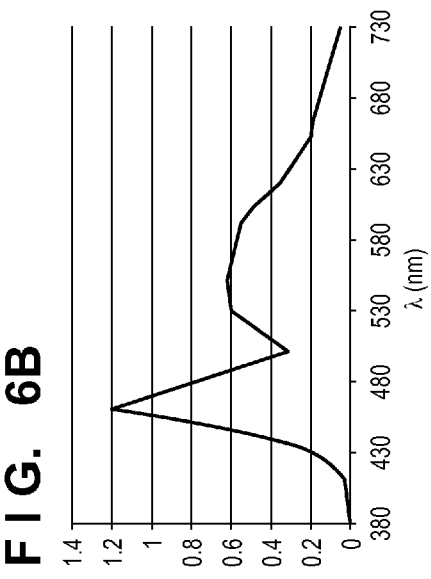
FIG. 5A    FIG. 5B
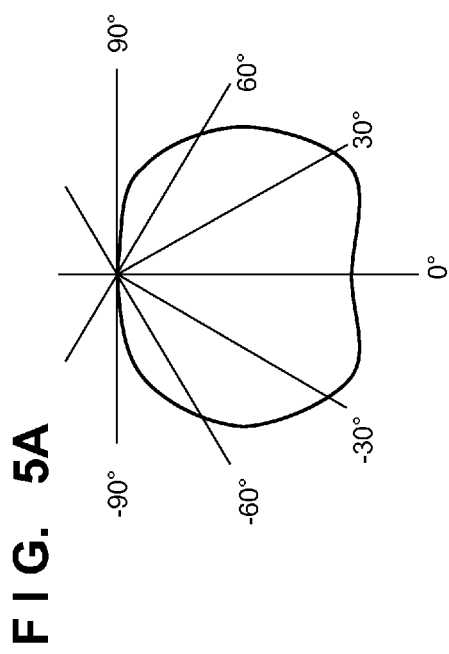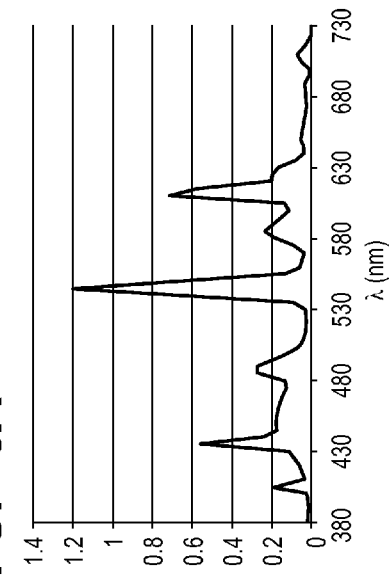
FIG. 6A    FIG. 6B

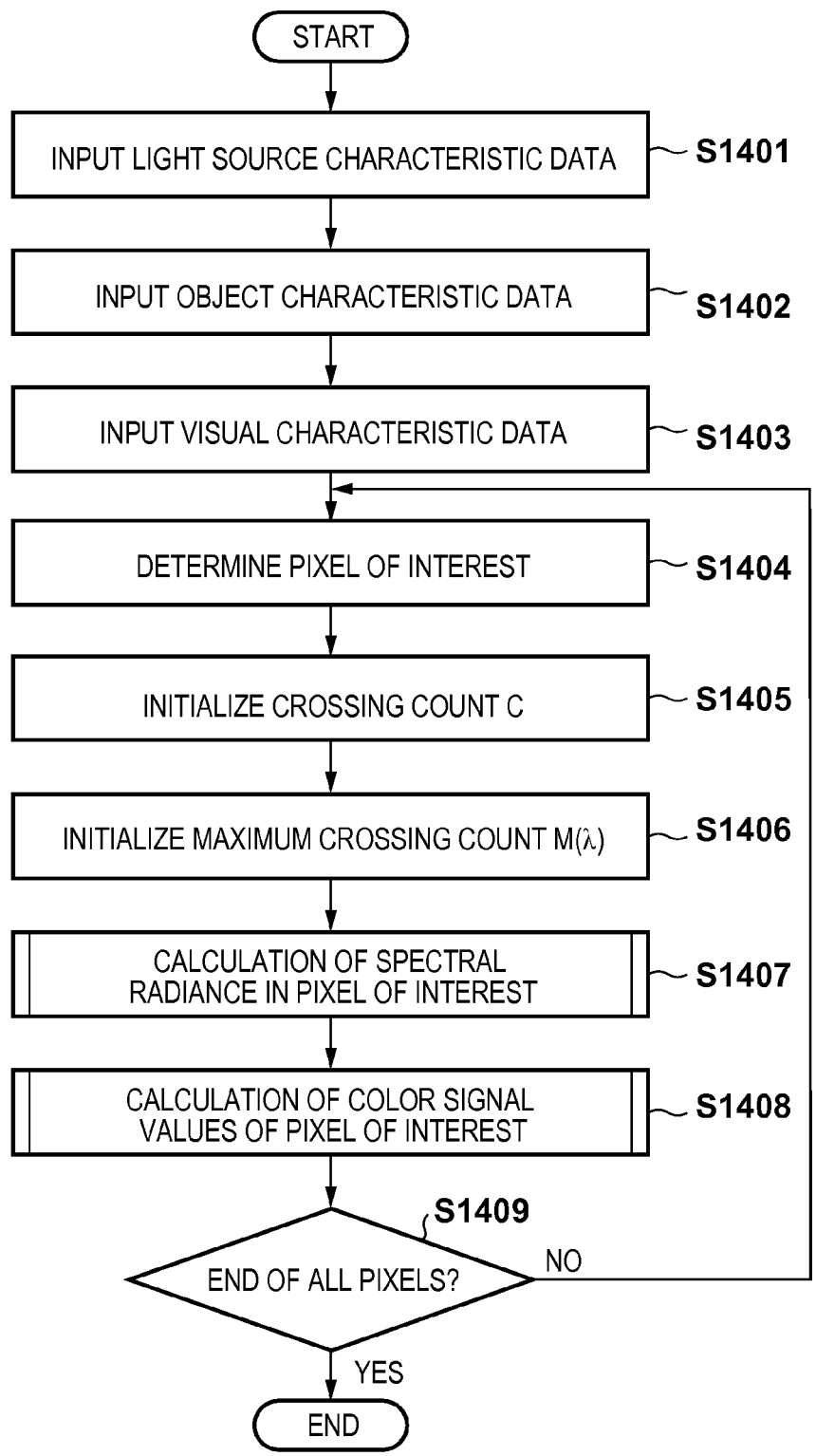
F I G. 12

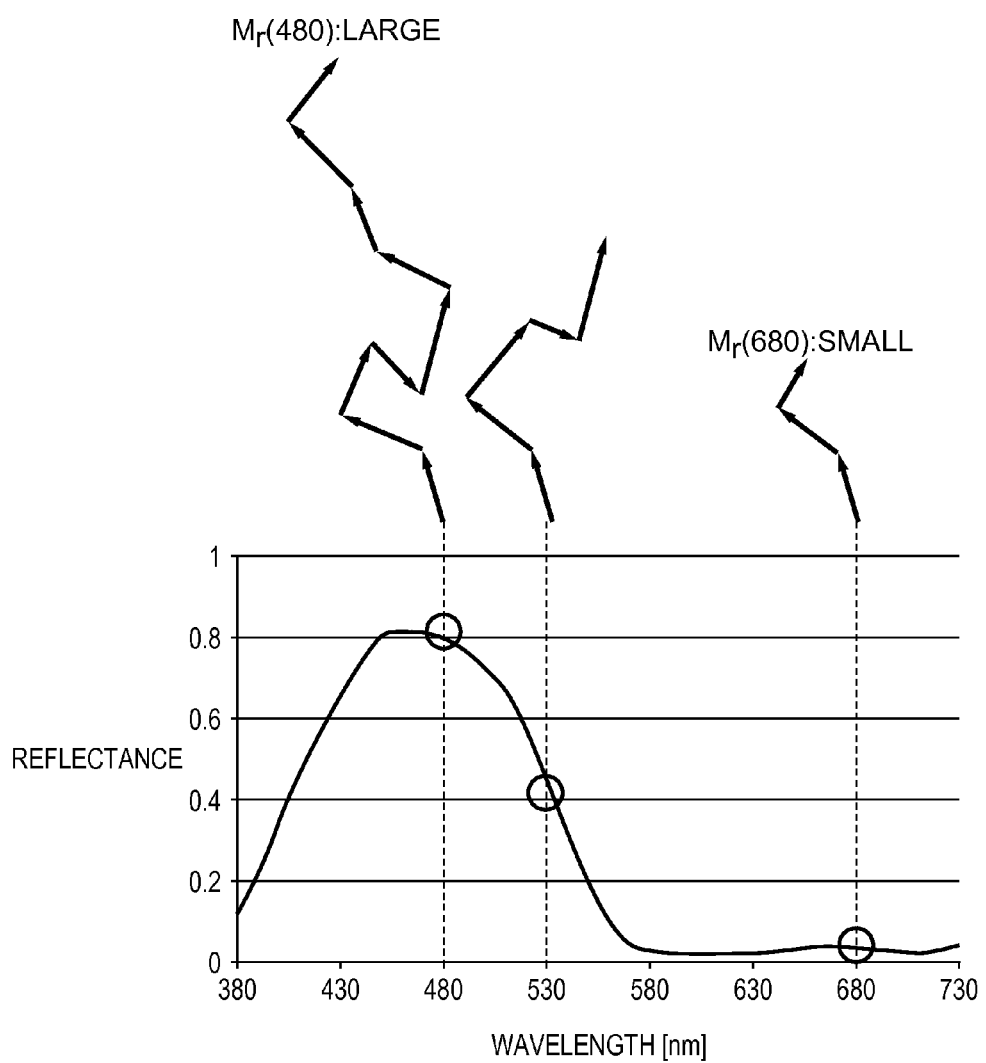
F I G. 14

IMAGE PROCESSING APPARATUS AND IMAGE PROCESSING METHOD

BACKGROUND OF THE INVENTION

1. Field of the Invention

The present invention relates to an image processing apparatus and image processing method and, more particularly, to an image processing apparatus and image processing method for generating an image using ray tracing.

2. Description of the Related Art

Recently, computer graphics (CG) have been used in various fields. CG is widely used even in the design field. In this field, a technique for generating an image that is more faithful to a real object is required.

As a method for faithfully reproducing a real object using CG, various techniques including the following ones have been known. Examples are a method using a multi-angle spectral reflection property to simulate reflection by a paint or the like having optically complicated properties, and a method using the multi-angle spectral reflection property of an object to reproduce a highly realistic image on the monitor. Other examples are a method using a spectral refraction property to reproduce the color of reflection, and a method using multiband data captured by a multispectral camera.

Image generation methods in CG include a scan line method, Z-buffer method, and ray tracing method. Of these methods, the ray tracing method is suitable for generating an image faithful to a real object because it can express reflection and refraction by tracing the propagation path of light in a 3D space. However, the ray tracing method needs to repetitively trace the paths of a great number of rays. To obtain a high-quality image in a complicated scene, this method requires an enormous amount of calculation. As efficient algorithms for the ray tracing method, binary space partitioning, bounding volume, and the like are proposed. For example, as a technique using binary space partitioning, there is proposed a method of partitioning in advance a virtual space into a plurality of voxels, performing crossing detection for only objects in voxels through which rays pass, and generating an image.

However, the conventional methods of generating a CG image do not consider the light distribution characteristics of light sources. These methods cannot reproduce a change of a shadow which is generated in a scene depending on light sources having different light distribution characteristics such as a fluorescent light and light-emitting diode (LED) illumination.

A general ray tracing method handles light as wavelength-independent uniform rays. This method cannot accurately reproduce a physical phenomenon in which the behavior changes depending on the wavelength, such as refraction of light passing through an object.

SUMMARY OF THE INVENTION

In one aspect, an image processing apparatus for generating a computer graphics image, comprising: a first input section configured to input light source characteristic data representing a spectral characteristic and light distribution characteristic of at least one light source which illuminates a scene; a second input section configured to input object characteristic data representing a spectral property of at least one object contained in the scene; a trace section configured to perform ray tracing for respective rays having different wavelengths, and calculate a spectral radiance in each pixel of a computer graphics image which represents the scene based on the light source characteristic data and the object characteristic data; and a generator configured to calculate color signal values of each pixel from the spectral radiance in the each pixel, and generate the computer graphics image of the scene.

In another aspect, an image processing method of generating a computer graphics image, comprising the steps of: inputting light source characteristic data representing a spectral characteristic and light distribution characteristic of at least one light source which illuminates a scene; inputting object characteristic data representing a spectral property of at least one object contained in the scene; performing ray tracing for respective rays having different wavelengths to calculate a spectral radiance in each pixel of a computer graphics image which represents the scene based on the light source characteristic data and the object characteristic data; and calculating color signal values of each pixel from the spectral radiance in the each pixel to generate the computer graphics image of the scene.

According to these aspects, a computer graphics image which faithfully reproduces a scene can be generated by ray tracing which considers the light distribution characteristics and spectral characteristics of a light source and the spectral characteristics of an object.

Further features of the present invention will become apparent from the following description of exemplary embodiments with reference to the attached drawings.

BRIEF DESCRIPTION OF THE DRAWINGS

FIG. 4 is a flowchart showing image generation processing in the first embodiment.

FIGS. 5A and 5B are schematic views for explaining the light distribution characteristics of a light source.

FIGS. 6A and 6B are graphs exemplifying the spectral radiance of a light source.

FIG. 12 is a flowchart showing image generation processing in the second embodiment.

FIG. 14 is a graph showing a concept of a method of setting a maximum crossing count in ray tracing in the second embodiment.

DESCRIPTION OF THE EMBODIMENTS

An image processing apparatus and image processing method according to embodiments of the present invention will now be described with reference to the accompanying drawings. It is to be understood that the following embodiments are not intended to limit the present invention regarding the appended claims, and that not all combinations of features set forth in the embodiments are indispensable for a solution of problems in the present invention.

First Embodiment

The first embodiment will explain processing of generating a computer graphics image (CG image) which faithfully reproduces a scene by ray tracing in consideration of the light distribution characteristics and spectral radiation characteristics of a light source and the spectral reflection property of an object.

Figure 1:
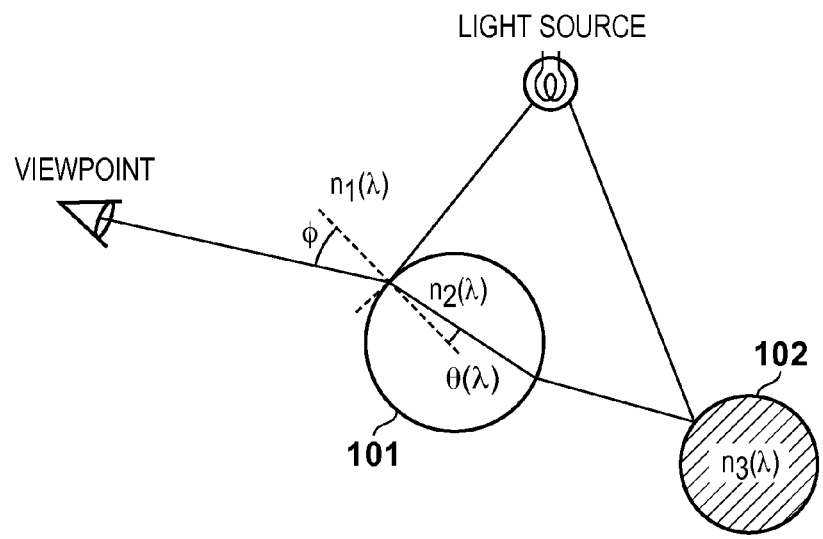
FIG. 1 is a schematic view for explaining reflection and transmission of light by an object.

The behavior of light which changes depending on the wavelength will be explained with reference to FIG. 1. When light strikes an object, it is split into light reflected by the surface of the object and light passing through the object. The refraction angle of the light passing through the object changes depending on a refractive index corresponding to the wavelength $\lambda$. For example, a case in which a ray having passed through a space having a spectral refractive index $n_1(\lambda)$ passes through an object 101 having a spectral refractive index $n_2(\lambda)$ using a viewpoint as a start point, as shown in FIG. 1, will be examined. At this time, letting $\phi$ be the incident angle of a ray with respect to the object 101, the refraction angle $\theta(\lambda)$ is given by $$\theta(\lambda) = \sin^{-1}[\{n_1(\lambda)/n_2(\lambda)\} \sin \phi] \quad (1)$$

Since the refraction angle is a function of the wavelength $\lambda$ of light, the path of light to be traced by ray tracing changes depending on the wavelength $\lambda$. Hence, light needs to be handled as spectra in order to faithfully reproduce transmission of light in a given scene in which, for example, light having passed through the object 101 in FIG. 1 further passes through an object 102 having a spectral refractive index $n_3(\lambda)$.

Apparatus Arrangement

Figure 2:
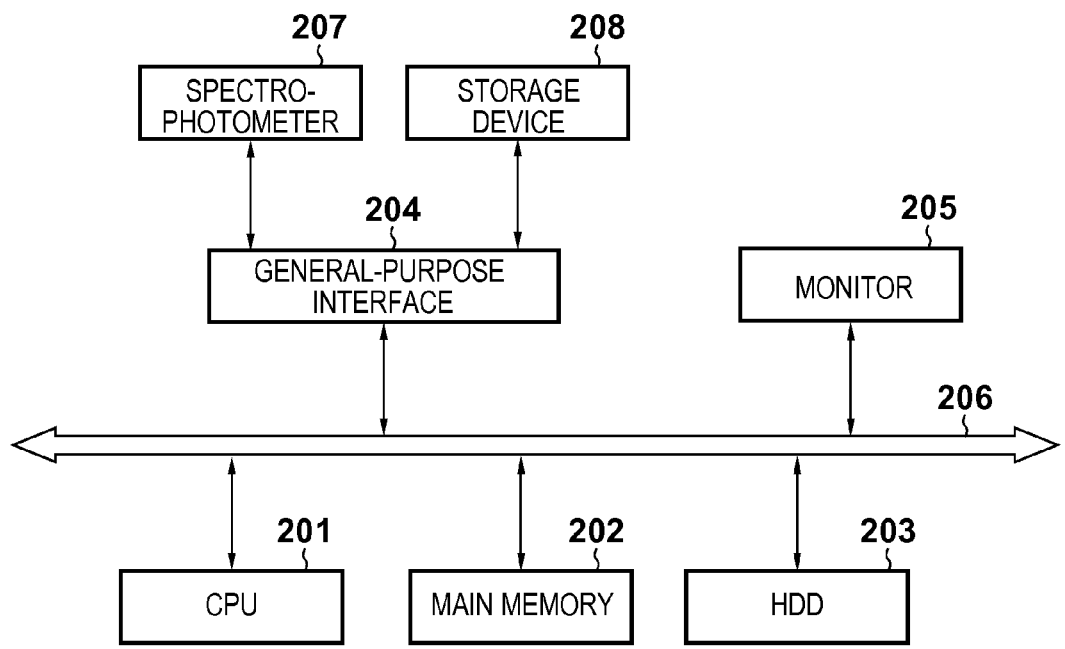
FIG. 2 is a block diagram showing the arrangement of an image processing apparatus in the first embodiment.

The arrangement of an image processing apparatus in the first embodiment will be described with reference to FIG. 2. As shown in FIG. 2, the image processing apparatus in the first embodiment includes a microprocessor (CPU) 201, main memory 202 comprising a random access memory (RAM) and a read-only memory (ROM), hard disk drive (HDD) 203, general-purpose interface (to be referred to as I/F hereinafter) 204, monitor 205, and system bus 206. The I/F 204 connects a spectrophotometer 207, external storage device 208, and the like to the system bus 206. The CPU 201 executes various software programs (computer programs) stored in the HDD 203, implementing various processes.

The CPU 201 loads, to a work area assigned in the main memory 202, an application program for image processing (to be referred to as an image processing AP hereinafter) stored in the HDD 203, and executes the image processing AP. In accordance with the image processing AP, the CPU 201 transfers, to the main memory 202 via the system bus 206, various data stored in the HDD 203, data input from the spectrophotometer 207 and external storage device 208 which are connected to the I/F 204, and the like. In accordance with the image processing AP, the CPU 201 executes various calculations for data stored in the work area of the main memory 202, displays the calculation results on the monitor 205 via the system bus 206, and stores them in the HDD 203.

Logical Arrangement

Image processing when the CPU 201 generates an image in accordance with the image processing AP and displays it on the monitor 205 in the above arrangement will be explained in detail.

Figure 3:
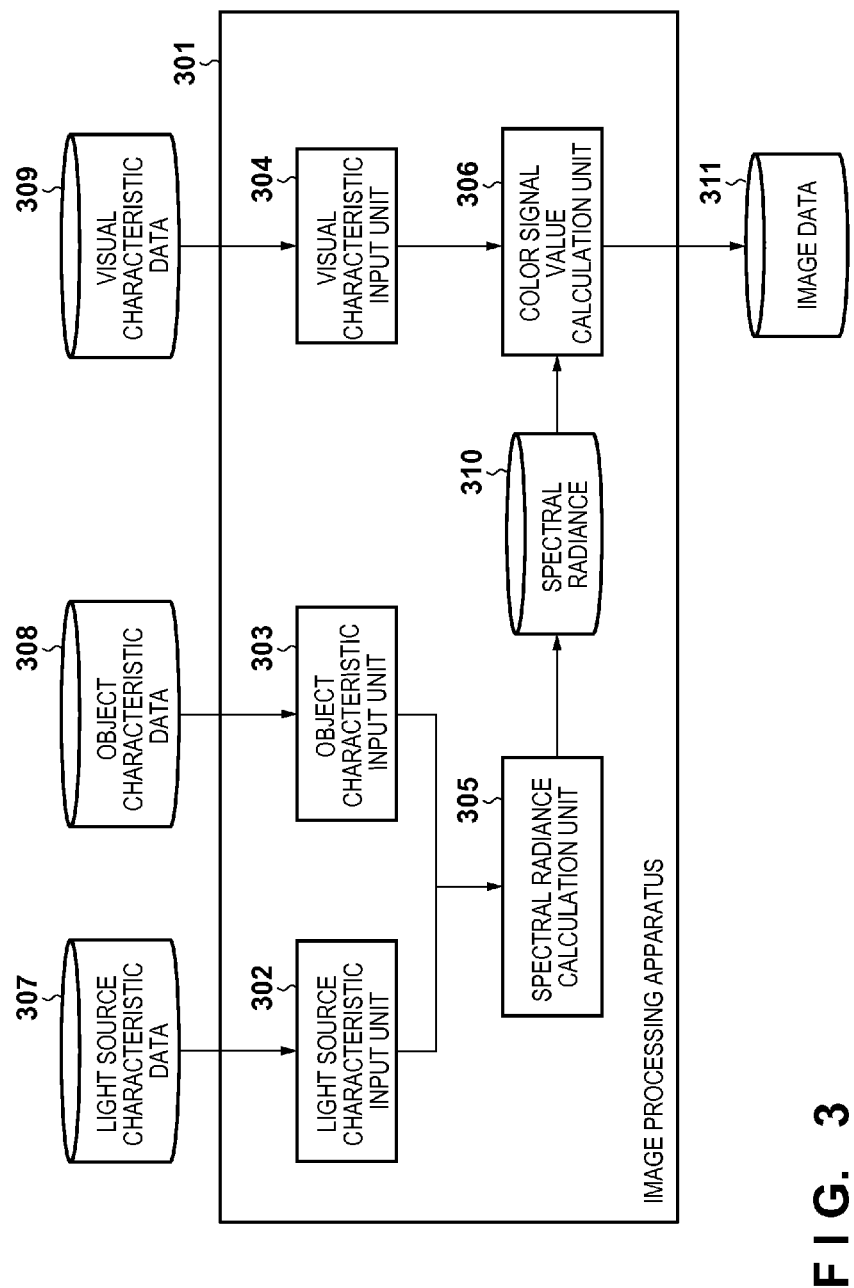
FIG. 3 is a block diagram showing the logical arrangement of the image processing apparatus in the first embodiment.

FIG. 3 is a block diagram showing the logical arrangement of an image processing apparatus 301 in the first embodiment. Each building component shown in FIG. 3 is implemented by executing the image processing AP by the CPU 201, as described above.

Referring to FIG. 3, a light source characteristic input unit 302 inputs light source characteristic data 307 representing the light distribution characteristics and spectral radiance of at least one light source which illuminates a scene. Note that the spectral radiance of a light source will also be simply referred to as the "spectral characteristics of a light source". An object characteristic input unit 303 inputs object characteristic data 308 representing the spectral reflection property, spectral transmission property, and spectral refractive index of at least one object which forms a scene. Note that the spectral reflection property, spectral transmission property, and spectral refractive index of an object will also be simply referred to as the "reflection property, transmission property, and refractive index of an object". A visual characteristic input unit 304 inputs visual characteristic data 309 when observing a scene.

Note that the light source characteristic data 307, object characteristic data 308, and visual characteristic data 309 are input from the spectrophotometer 207 or external storage device 208 via the HDD 203 or I/F 204.

A spectral radiance calculation unit 305 calculates a spectral radiance 310 in each pixel of the CG image of a scene based on information input by the light source characteristic input unit 302 and information input by the object characteristic input unit 303.

A color signal value calculation unit 306 calculates the color signal values of each pixel in the CG image of a scene based on the spectral radiance 310 in each pixel that has been calculated by the spectral radiance calculation unit 305, and the visual characteristic data 309 input by the visual characteristic input unit 304. The color signal values are calculated as, for example, R, G, and B values, and output as image data 311. The image data 311 is stored in a storage area such as the HDD 203, and an image represented by the image data 311 is displayed on the monitor 205.

Scene CG Image Generation Processing

Image generation processing of generating the CG image of a scene in the image processing apparatus 301 in the first embodiment will be explained with reference to the flowchart of FIG. 4. Note that the image generation processing shown in FIG. 4 is executed by the logical arrangement shown in FIG. 3 that is implemented by executing the image processing AP by the CPU 201.

First, the light source characteristic input unit 302 inputs the light source characteristic data 307 (S401). As described above, the light source characteristic data 307 represents the light distribution characteristics and spectral radiance of a light source which illuminates a scene.

The light distribution characteristics of a light source will be explained with reference to FIGS. 5A and 5B. The light distribution characteristics represent the intensity distribution of light emitted by a light source in respective directions. The range in which one light source illuminates a scene changes depending on the difference in the directivity of the light source. FIG. 5A exemplifies the light distribution characteristics of a light source having low directivity such as a fluorescent light, and shows that such a light source illuminates a scene widely. In contrast, FIG. 5B exemplifies the light distribution characteristics of a light source having high directivity such as an LED, and shows that such a light source illuminates only part of a scene. In this manner, when the light distribution characteristics of a light source change, a shadow generated in a scene changes greatly. The light distribution characteristics of a light source are an important factor to faithfully reproduce a scene.

As the light distribution characteristics, data stored in the HDD 203 or the like may be input, or data obtained by measuring a light source by the spectrophotometer 207 connected to the I/F 204 may be input. The format of input data is arbitrary as long as the correspondence between the output angle of light from a light source and the intensity of light is obtained. For example, the format may be a function of the intensity of light with respect to the output angle, or a lookup table (LUT) representing the correspondence between the output angle and the intensity of light.

The spectral radiance will be explained with reference to FIGS. 6A and 6B. The spectral radiance of a light source represents the distribution of luminances at respective wavelengths, and the characteristics change depending on a light source. FIG. 6A exemplifies the spectral radiance distribution of a fluorescent light. FIG. 6B exemplifies the spectral radiance distribution of an LED illumination. When the type of light source changes, the spectral radiance distribution also changes, and thus the color appearance of an object changes. Hence, the spectral radiance (spectral characteristics) of a light source is an important factor to faithfully reproduce a scene. As the spectral characteristics, similar to the light distribution characteristics, data stored in the HDD 203 or the like may be input, or data obtained by measuring a light source by the spectrophotometer 207 connected to the I/F 204 may be input.

The format of input data is arbitrary as long as the correspondence between a wavelength in the visible light range and the radiance is obtained. For example, the format may be a function of the radiance with respect to the wavelength of light, or an LUT representing the correspondence between the wavelength and the radiance.

Then, the object characteristic input unit 303 inputs the object characteristic data 308 (S402). As described above, the object characteristic data 308 represents the reflection property, transmission property, and refractive index of each object contained in a scene.

Figure 7:
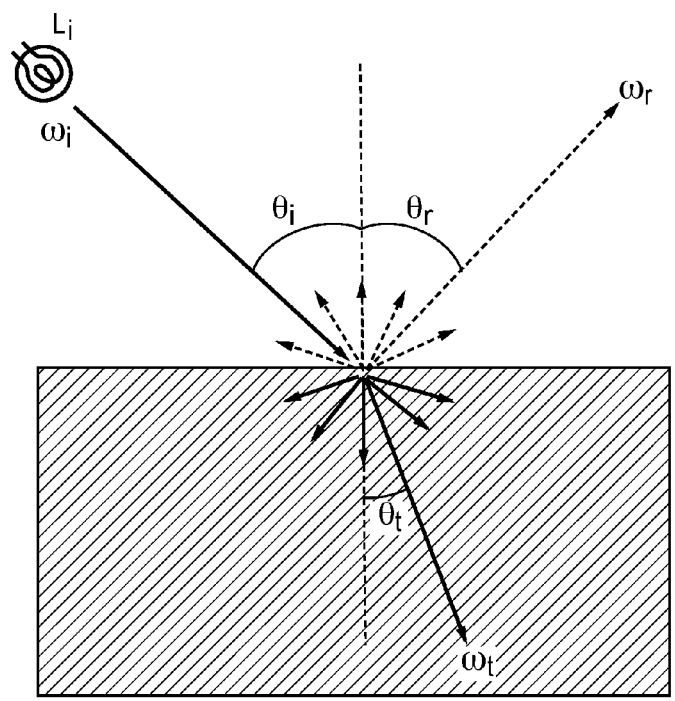
FIG. 7 is a schematic view for explaining the reflection property and transmission property of an object.

The reflection property and transmission property of an object will be explained with reference to FIG. 7. In general, the reflection property of an object is represented by a bidirectional reflectance distribution function (BRDF) $f_r$. The reflection property $f_r$ at a position x on an object is given by $$f_r(x, \vec{\omega}_i, \lambda_r, \vec{\omega}_r) = \{dL_r(x, \lambda_r, \vec{\omega}_r)\}/\{L_i(x, \lambda_i, \vec{\omega}_i)(\vec{\omega}_i \cdot \vec{n})d\vec{\omega}_i\} \quad (2)$$

where $\lambda_i$ and $L_i$ are the wavelength and intensity of light entering from the direction $\omega_i$, $\lambda_r$ and $dL_r$ are the wavelength and intensity of light reflected in the direction $\omega_r$, and n is the normal vector at the position x.

In general, the intensity distribution of reflected light depends on the surface shape of an object. As the object surface becomes smoother, a reflection intensity in the specular reflection direction, that is, $\theta_i = \theta_r$ direction becomes higher, and a reflection intensity in the diffuse reflection direction becomes lower.

As a method of acquiring the reflection property $f_r$ of an object, data stored in the HDD 203 or the like may be input, or data measured by the spectrophotometer 207 connected to the I/F 204 may be input. The data format of the reflection property $f_r$ is arbitrary as long as a reflectance corresponding to the incident angle and reflection angle of light with respect to an object is obtained. For example, the reflection property $f_r$ may be input as a unique function as represented by equation (2). Alternatively, reflection properties may be input divisionally. For example, diffuse reflection is distributed isotropically, so a reflection property for $\omega_i = 45°$ and $\omega_r = 0°$ is applied to diffuse reflection and a reflection property for specular reflection is separately obtained from an LUT.

The transmission property of an object is represented by a bidirectional transmittance distribution function (BTDF) $f_t$. The transmission property $f_t$ at a position x on an object is given by $$f_t(x, \vec{\omega}_i, \lambda_t, \vec{\omega}_t) = \{dL_t(x, \lambda_t, \vec{\omega}_t)\}/\{L_i(x, \lambda_i, \vec{\omega}_i)(\vec{\omega}_i \cdot \vec{n})d\vec{\omega}_i\} \quad (3)$$

where $\lambda_t$ and $dL_t$ are the wavelength and intensity of light transmitted in the direction $\omega_t$.

In general, the intensity distribution of transmitted light depends on the refractive index. When $\omega_t$ satisfies equation (1), the intensity of transmitted light becomes maximum.

As a method of acquiring the transmission property $f_t$ of an object, data stored in the HDD 203 or the like may be input, or data measured by the spectrophotometer 207 connected to the I/F 204 may be input. The data format of the transmission property $f_t$ is arbitrary as long as a transmittance corresponding to the incident angle and refraction angle of light with respect to an object is obtained. For example, the transmission property $f_t$ may be input as a unique function as represented by equation (3). Alternatively, transmission properties may be input divisionally. For example, a transmission property for $\omega_i = \omega_t = 0°$ is applied to a case in which $\omega_t$ is equal to the refraction angle θ in equation (1), and a transmission property for another case is separately obtained from an LUT.

Figure 8:
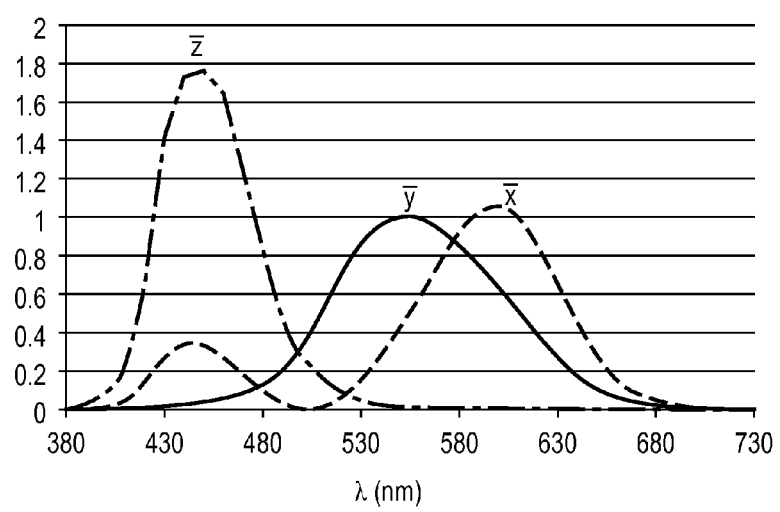
FIG. 8 is a graph exemplifying visual characteristic data.

After that, the visual characteristic input unit 304 inputs the visual characteristic data 309 (S403). The visual characteristic data 309 is used when converting a spectral radiance into the color signal values of an image. FIG. 8 shows color matching functions used in the CIEXYZ colorimetric system as an example of the visual characteristic data 309. The color matching function represents the sensitivity of an eye to light in the visible light range. As the visual characteristic data 309, data stored in advance in the HDD 203 or the like suffices to be input.

Then, the spectral radiance calculation unit 305 scans the CG image of the scene to determine a pixel (to be referred to as a pixel of interest hereinafter) subjected to calculation of a spectral radiance (S404). Note that the determination order of the pixel of interest is arbitrary.

The spectral radiance calculation unit 305 calculates the spectral radiance 310 in the pixel of interest (S405). The spectral radiance 310 is calculated using ray tracing, and details of the processing will be described later.

Thereafter, the color signal value calculation unit 306 calculates the color signal values of the pixel of interest (S406). Details of the color signal value calculation method will be described later.

The CPU 201 determines whether calculation of color signal values has ended for all the pixels of the CG image of the scene (S407). If the calculation has ended, the image data 311 generated by the color signal value calculation unit 306 is output, and the process ends. If the calculation has not ended, the process returns to step S404 to determine the next pixel of interest, and continues.

Spectral Radiance Calculation Processing

The spectral radiance calculation processing (S405) will be explained in detail with reference to FIG. 9. As described above, calculation of the spectral radiance in the first embodiment uses ray tracing. This method renders a CG image by virtually tracing, up to a light source, rays which should be received at the viewpoint from respective directions within the angle of view. More specifically, straight lines (rays) are extended from the viewpoint toward pixels to be rendered, and the presence/absence of a crossing of an object and ray is mathematically determined. Tracing of a ray generated by reflection or transmission is recursively repeated, and when the light source and ray cross each other, the tracing of the ray ends. That is, in the first embodiment, a plurality of rays are traced by recursively executing ray tracing shown in the flowchart of FIG. 9, and a spectral radiance in the pixel of interest is calculated from the average of spectral radiances calculated for respective rays.

Spectral radiance calculation processing for monochromatic light having the wavelength $\lambda$ will be explained with reference to FIG. 9. A spectral radiance in the pixel of interest is actually obtained by executing the same processing for each wavelength. Assume that processing target wavelengths are extracted at equal intervals from the visible range. For example, 36 wavelengths are extracted as processing target wavelengths at an interval of 10 nm in a visible range of 380 to 730 nm.

First, a point (to be referred to as an intersection point hereinafter) at which a ray having a wavelength $\lambda$ that has been cast from the start point of tracing crosses an object or light source in a scene is searched for (S901). The start point of tracing is the pixel of interest in the first execution of the processing shown in FIG. 9, and an intersection point between a ray and an object in recursive execution of the processing shown in FIG. 9. Note that the intersection point search method is arbitrary. For example, crossing detection is sequentially performed for all objects and light sources within a scene to obtain an intersection point closest to the start point of tracing.

It is determined which of an intersection point between a light source and the ray and an intersection point between an object and the ray is the intersection point detected in step S901 (S902). If the ray crosses a light source, a spectral radiance for the wavelength $\lambda$ is calculated from the intensity of the ray and the light source characteristic data 307 of the crossing light source (S903). Then, ray tracing for the current wavelength ends. Since the light source characteristic data 307 represents the light distribution characteristics and spectral radiance of a light source, the spectral radiance $E_0(\lambda)$ of a ray is given by $$E_0(\lambda)=P_0(\lambda)\times Q(\theta)\times S(\lambda) \quad (4)$$

where $P_0(\lambda)$ is the intensity of a ray at the wavelength $\lambda$,
$\theta$ is the angle defined by the ray and a light source,
$Q(\theta)$ is the light distribution characteristics of the light source in the $\theta$ direction, and
$S(\lambda)$ is the radiance of the light source at the wavelength $\lambda$.

If the ray crosses an object other than a light source, first, the object characteristic data 308 (reflection property, transmission property, and refractive index) of the object crossing the ray is acquired (S904).

Then, the number of rays (to be referred to as the number of rays to be cast hereinafter) to be cast from the intersection point between the ray and the object is determined (S905). Although the number of rays to be cast may be arbitrarily determined, an image with less noise is obtained as the number of rays to be cast increases. Processes in steps S906 and S907 are repeated by the number of times corresponding to the number of rays to be cast.

In step S906, the directions and intensities of rays to be cast are calculated. The directions of rays suffice to be distributed uniformly in accordance with the number of rays to be cast. The intensity $P_r(\lambda)$ of reflected light and the intensity $P_t(\lambda)$ of transmitted light at the intersection point are respectively given by $$P_r(\lambda)=P_0(\lambda)\times f_r(x,\omega_i,\lambda,\omega_r) \quad (5)$$

$$P_t(\lambda)=P_0(\lambda)\times f_t(x,\omega_i,\lambda,\omega_t) \quad (6)$$

where $P_0(\lambda)$ is the intensity of a ray before crossing an object at the wavelength $\lambda$,
$f_r$ is the reflection property of the object given by equation (2), and
$f_t$ is the transmission property of the object given by equation (3).

Figure 9:
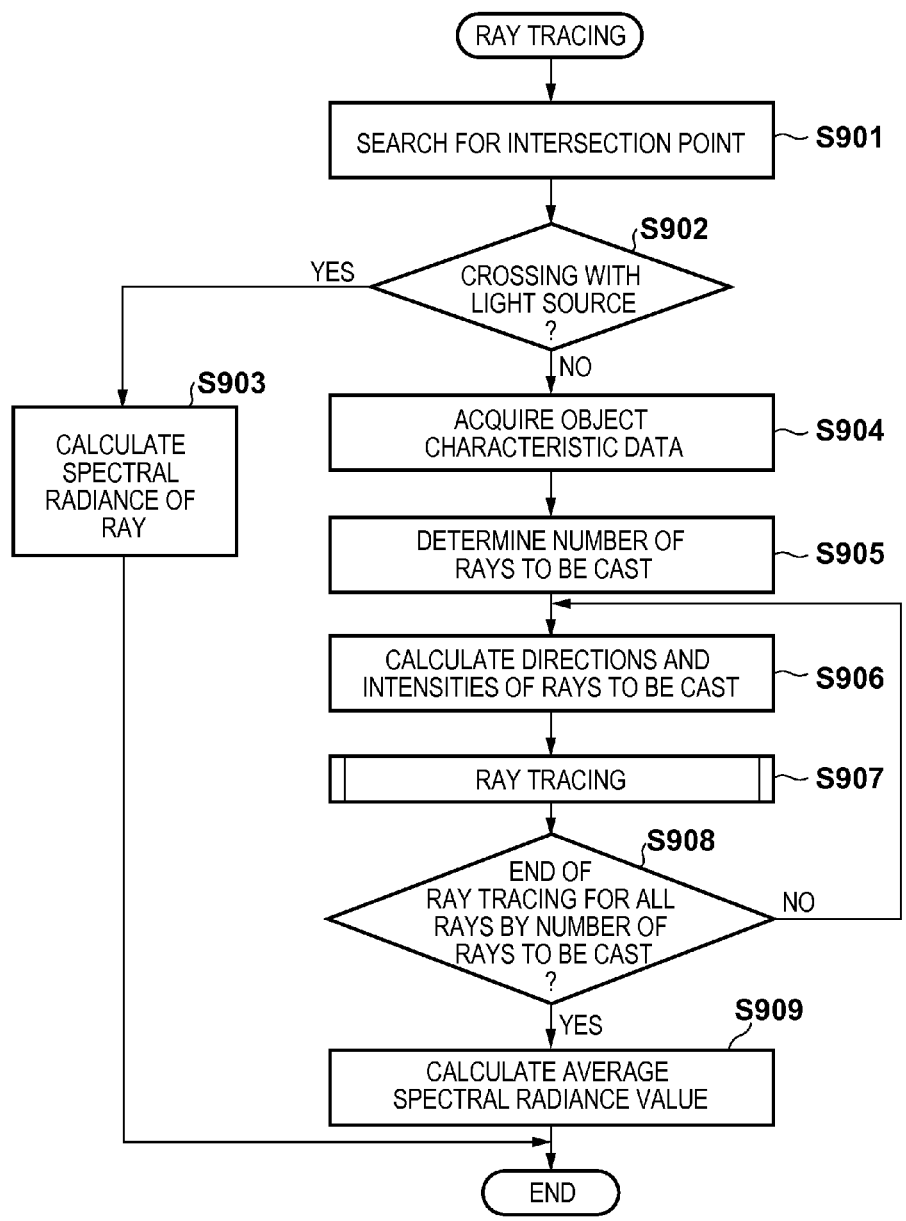
FIG. 9 is a flowchart showing spectral radiance calculation processing in the first embodiment.

In step S907, ray tracing is performed for the ray by recursively invoking ray tracing shown in FIG. 9. The processing in step S907 ends when no crossing object remains finally in recursive processing and a spectral radiance for the ray is calculated in step S903. In other words, the spectral radiance $E_0(\lambda)$ finally calculated according to equation (4) in the recursive processing of step S907 becomes a spectral radiance $E_n(\lambda)$ for the ray.

If it is determined in step S908 that the processes in steps S906 and S907 have ended for all rays by the number of rays to be cast, the average of the spectral radiances $E_n(\lambda)$ of the respective rays is calculated (S909). The average spectral radiance value serves as a spectral radiance $E_x(\lambda)$ at the tracing target wavelength $\lambda$ in the pixel of interest. More specifically, the spectral radiance $E_x(\lambda)$ at the tracing target wavelength $\lambda$ in the pixel of interest is calculated in accordance with equation (7):

$$E_x(\lambda)=(1/N)\cdot\Sigma_{n=0}^{N-1}E_n(\lambda) \quad (7)$$

where N is the number of rays to be cast, and $0\leq n \leq N-1$.

In this fashion, in the spectral radiance calculation processing (S405), the spectral radiance $E_x(\lambda)$ in the pixel of interest is calculated by recursively executing ray tracing shown in FIG. 9.

Color Signal Value Calculation Processing

Figure 10:
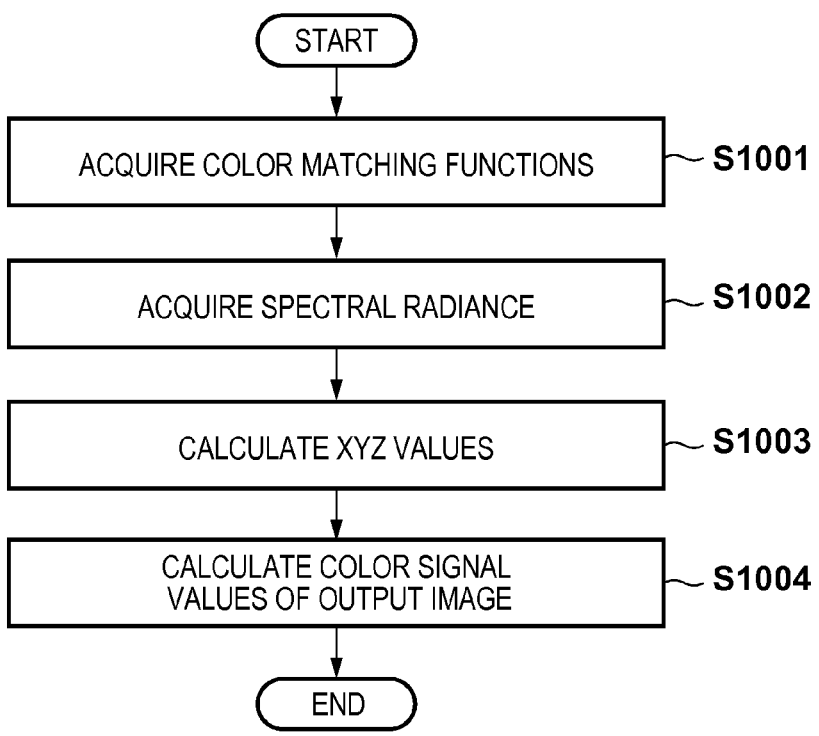
FIG. 10 is a flowchart showing color signal value calculation processing in the first embodiment.

The color signal value calculation processing (S406) for each pixel will be explained in detail with reference to FIG. 10. In the first embodiment, color signal values of the sRGB system are finally output. However, output color signal values may be color signal values of another system such as AdobeRGB.

First, color matching functions of, for example, the CIEXYZ colorimetric system are acquired from the visual characteristic data 309 input in step S403 (S1001). Then, the spectral radiance $E_x(\lambda)$ of each pixel that has been calculated in step S405 is acquired (S1002). CIEXYZ values Xout, Yout, and Zout are calculated from the acquired color matching functions and spectral radiance $E_x(\lambda)$ in accordance with equations (8) to (10) (S1003):

$$X\text{out}=\int_{380}^{730}E_x(\lambda)\bar{x}(\lambda)d\lambda \quad (8)$$

$$Y\text{out}=\int_{380}^{730}E_x(\lambda)\bar{y}(\lambda)d\lambda \quad (9)$$

$$Z\text{out}=\int_{380}^{730}E_x(\lambda)\bar{z}(\lambda)d\lambda \quad (10)$$

where $\bar{x}(\lambda)$, $\bar{y}(\lambda)$, and $\bar{z}(\lambda)$ are color matching functions.

The color signal values of an output image are calculated (S1004). Since the output color signal values comply with the sRGB system, color signal values Rout, Gout, and Bout are calculated in accordance with equations (11) and (12):

$$\begin{bmatrix} R_{Linear} \\ G_{Linear} \\ B_{Linear} \end{bmatrix} = \begin{bmatrix} 3.2406 & -1.5372 & -0.4986 \\ -0.9689 & 1.8758 & 0.0415 \\ 0.0557 & -0.2040 & 1.0570 \end{bmatrix} \begin{bmatrix} Xout \\ Yout \\ Zout \end{bmatrix} \quad (11)$$

if $(R_{Linear} \leq 0.0031308)$
$Rout = 12.92 \times R_{Linear}$;
else
$Rout = 1.055 \times R_{Linear}^{1/2.4} - 0.055$;
if $(G_{Linear} \leq 0.0031308)$
$Gout = 12.92 \times G_{Linear}$;
else
$Gout = 1.055 \times G_{Linear}^{1/2.4} - 0.055$;
if $(B_{Linear} \leq 0.0031308)$
$Bout = 12.92 \times B_{Linear}$;
else
$Bout = 1.055 \times B_{Linear}^{1/2.4} - 0.055$; \quad (12)

By the above-described image generation processing, an output image serving as the CG image of a scene is generated.

As described above, ray tracing in a scene is performed in consideration of the light distribution characteristics and spectral characteristics of a light source and the spectral characteristics (reflection property, transmission property, and refractive index) of an object. Accordingly, a CG image which faithfully reproduces the scene can be generated.

Modification of First Embodiment

Figure 11A:
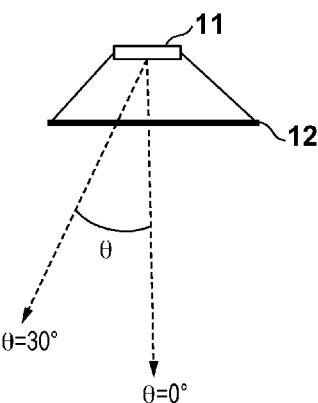
FIGS. 11A to 11C are a view and graphs, respectively, exemplifying the wavelength dependence of the light distribution characteristics of a light source.
Figure 11B:
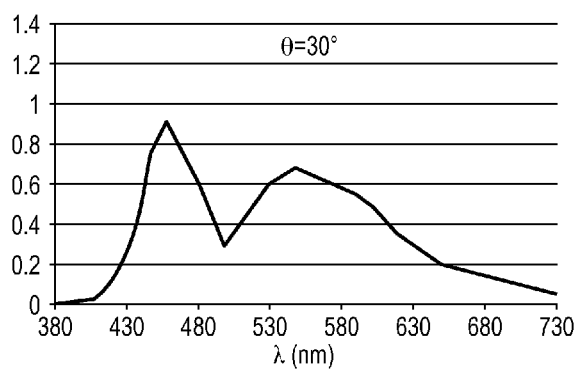
Figure 11C:
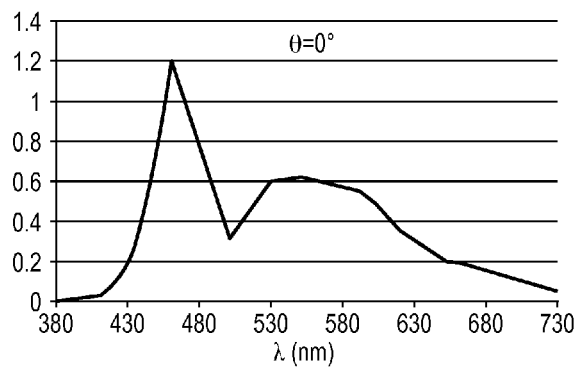

In the first embodiment, light distribution characteristics represented by the light source characteristic data 307 are handled as the intensity distribution of light. However, the intensity distribution of light changes depending on the wavelength in some cases. For example, for an LED illumination, the light source is sometimes formed by combining an LED 11 which emits blue light, and a fluorescent substance 12 which emits yellow light, as shown in FIG. 11A. At this time, the LED 11 emits light having high directivity, as shown in FIG. 5B, so color nonuniformity is generated when the LED 11 is combined with the fluorescent substance 12. Since the light distribution characteristics of a light source change depending on the wavelength, as shown in FIGS. 11B and 11C, the spectral radiance also depends on the angle θ defined by a ray and light source.

It is therefore considered to input, as the light source characteristic data 307, light distribution characteristics which change depending on the wavelength. In this case, the spectral radiance calculation processing (S405) is almost the same as the processing shown in FIG. 9 except for the final spectral radiance calculation processing in step S903. More specifically, when the light source has wavelength-dependent light distribution characteristics, the light distribution characteristics are represented as a function Q(λ, θ) of the wavelength λ and the angle θ defined by a ray and the light source. In this case, the spectral radiance S(λ) of the light source is obtained from the light distribution characteristic Q(λ, θ) and becomes unnecessary. Thus, the spectral radiance $E_0(\lambda)$ of a ray in step S903 is calculated in accordance with equation (13):

$$E_0(\lambda) = P_0(\lambda) \times Q(\lambda, \theta) \quad (13)$$

In this way, even if the light distribution characteristics of a light source depend on the wavelength, a CG image which faithfully reproduces a scene can be generated, similar to the first embodiment.

Second Embodiment

In the first embodiment, a CG image which faithfully reproduces a scene is generated by performing ray tracing based on the light distribution characteristics and spectral characteristics of a light source and the spectral characteristics of an object. However, when ray tracing based on spectroscopy (to be referred to as spectral ray tracing hereinafter) is performed as in the first embodiment, the calculation amount increases in accordance with the number of wavelengths to be traced, decreasing the processing speed. Generally in ray tracing, the calculation amount can be suppressed to increase the processing speed by reducing the number of crossings of one ray and objects and the number of rays to be traced. However, these reductions generate noise in a generated image, degrading the image quality.

Also, when an efficient ray tracing method using binary space partitioning is applied to spectral ray tracing, if the number of crossings and the number of rays are reduced regardless of the wavelength of light for a higher processing speed, these reductions also generate noise. The second embodiment increases the processing speed and reduces noise by adding, to the technical feature of the first embodiment, a technical feature of controlling the calculation amount in ray tracing in accordance with the spectral characteristics of a light source and object.

Note that the arrangement of an image processing apparatus in the second embodiment is the same as those shown in FIGS. 2 and 3 in the first embodiment. The same reference numerals denote the same parts, and a description thereof will not be repeated.

Scene CG Image Generation Processing

Image generation processing of generating the CG image of a scene in an image processing apparatus 301 in the second embodiment will be explained with reference to the flowchart of FIG. 12. Note that the image generation processing shown in FIG. 12 is executed by the logical arrangement shown in FIG. 3 that is implemented by executing an image processing AP by a CPU 201.

First, a light source characteristic input unit 302 inputs light source characteristic data 307 (S1401). The light source characteristic data 307 represents the light distribution characteristics and spectral radiance of a light source which illuminates a scene, as shown in FIGS. 5A, 5B, 6A, and 6B.

Then, an object characteristic input unit 303 inputs object characteristic data 308 (S1402). As shown in FIG. 7, the object characteristic data 308 represents the reflection property, transmission property, and refractive index of each object contained in a scene.

A visual characteristic input unit 304 inputs visual characteristic data 309 (S1403). The visual characteristic data 309 is used when converting a spectral radiance into the color signal values of an image. The visual characteristic data 309 includes, for example, color matching functions shown in FIG. 8.

A spectral radiance calculation unit 305 scans the CG image of the scene to determine a pixel of interest subjected to calculation of a spectral radiance. Note that the determination order of the pixel of interest is arbitrary.

The spectral radiance calculation unit 305 initializes, to 0, a crossing count C which is a variable for counting the number of crossings of a ray traveling from the pixel of interest with objects during path tracing (S1405). Subsequently, the spectral radiance calculation unit 305 initializes the maximum crossing count M(λ) serving as the upper limit of the crossing count for each wavelength λ (S1406).

The maximum crossing count M(λ) is a threshold to, when a ray traveling from the pixel of interest crosses many objects until it reaches a light source, abort ray tracing in accordance with the crossing count C before the ray reaches the light source. A ray is desirably traced until it reaches a light source, but this requires an enormous amount of calculation. Thus, when a ray does not reach a light source by the maximum crossing count M(λ), ray tracing is aborted to reduce the calculation amount and shorten the calculation time.

As the initial value of the maximum crossing count M(λ), an arbitrary value of 1 or larger is set for each wavelength λ of light. If the maximum crossing count M(λ) is small, calculation can be performed quickly, but noise is generated in the image generation result. Therefore, the initial value of the maximum crossing count M(λ) is desirably set in consideration of the required calculation time and noise amount. As the initial value of the maximum crossing count M(λ), a fixed value independent of the wavelength λ of light is desirably set.

Thereafter, the spectral radiance calculation unit 305 calculates a spectral radiance 310 in the pixel of interest (S1407). The spectral radiance 310 is calculated using ray tracing, and details of the processing will be described later.

A color signal value calculation unit 306 calculates the color signal values of the pixel of interest (S1408). The color signal value calculation method is the same as the method described with reference to FIG. 10, and a description thereof will not be repeated.

Then, the CPU 201 determines whether calculation of color signal values has ended for all the pixels of the CG image of the scene (S1409). If the calculation has ended, image data 311 generated by the color signal value calculation unit 306 is output, and the process ends. If the calculation has not ended, the process returns to step S1404 to determine the next pixel of interest, and continues.

Spectral Radiance Calculation Processing

The spectral radiance calculation processing (S1407) will be explained in detail with reference to FIG. 13. Even in the second embodiment, a plurality of rays are traced by recursively executing ray tracing shown in the flowchart of FIG. 13, and a spectral radiance in the pixel of interest is calculated from the average of spectral radiances calculated for respective rays.

Spectral radiance calculation processing for monochromatic light having the wavelength λ will be explained with reference to FIG. 13. A spectral radiance in the pixel of interest is actually obtained by executing the same processing for each wavelength, similar to the first embodiment.

First, a point (intersection point) at which a ray having a wavelength λ that has been cast from the start point of tracing crosses an object or light source in a scene is searched for (S1901). Similar to the first embodiment, the start point of tracing is the pixel of interest in the first execution of the processing shown in FIG. 13, and an intersection point between a ray and an object in recursive execution of the processing shown in FIG. 13. Similar to the first embodiment, the intersection point search method is arbitrary.

It is determined which of an intersection point between a light source and the ray and an intersection point between an object and the ray is the intersection point detected in step S1901 (S1902). If the ray crosses a light source, the spectral radiance $E_0(\lambda)$ for the wavelength λ is calculated from the intensity of the ray and the light source characteristic data 307 of the crossing light source in accordance with equation (4) (S1914). Then, ray tracing for the current wavelength ends.

If the ray crosses an object other than the light source, the count value is updated by incrementing the crossing count C of the ray by one (S1903). The object characteristic data 308 (reflection property, transmission property, and refractive index) of the object crossing the ray is acquired (S1904).

Then, the crossing count C and the maximum crossing count M(λ) of the ray at the wavelength λ are compared (S1905). If the crossing count C has exceeded the maximum crossing count M(λ) (C>M(λ)), the process shifts to step S1913 in order to end ray tracing even if the ray has not reached the light source. If the crossing count C is equal to or smaller than the maximum crossing count M(λ) (C≤M(λ)), the process shifts to step S1906 in order to newly cast a plurality of rays from the intersection point between the ray and the object and perform ray tracing for the respective rays.

In this manner, the second embodiment increases the processing speed by aborting ray tracing before a ray reaches a light source when it does not reaches the light source by the preset maximum crossing count M(λ). Decreasing the maximum crossing count M(λ) can increase the calculation speed, but increases noise in a generated image. To prevent this, the second embodiment sets a maximum crossing count M(λ) optimum for each wavelength of light in accordance with the reflection property and transmission property of an object first crossing a ray, the radiance of a light source, and the initial value of the maximum crossing count M(λ) that has been set in step S1406, details of which will be described later.

For C≤M(λ), the number of rays (number N of rays to be cast) to be cast from the intersection point between the ray and the object is determined (S1906). The number of rays to be cast may be arbitrarily determined. However, as the number of rays to be cast increases, an image with less noise is obtained, but the calculation amount increases. Assume that the count value of the crossing count C of each ray to be newly cast and the value of the maximum crossing count M(λ) inherit the values of an original ray. Processes in steps S1907 to S1910 are repeated by the number of times corresponding to the number N of rays to be cast.

In step S1907, the directions and intensities of rays to be cast are calculated. The directions of rays suffice to be distributed uniformly in accordance with the number N of rays to be cast. The intensity $P_r(\lambda)$ of reflected light and the intensity $P_t(\lambda)$ of transmitted light at the intersection point are respectively given by equations (5) and (6), similar to the first embodiment.

In step S1908, it is determined whether the count value of the current crossing count C for the ray is 1. If the crossing count C is 1, that is, a crossing with the object determined in step S1902 is the first crossing, the process shifts to step S1909. If the count value of the crossing count C is not 1, that is, a crossing with the object determined in step S1902 is the second or subsequent crossing, the process shifts to step S1910.

In step S1909, the maximum crossing count M(λ) at the wavelength λ is calculated and updated in accordance with the spectral characteristics of the light source and those of the object. The method of setting the maximum crossing count M(λ) will be explained in detail. The maximum crossing count M(λ) is set for each of the reflected component and transmitted component of a ray with respect to an object contained in a scene.

For example, a ray having a wavelength at which the reflectance of an object is low greatly attenuates the radiance upon crossing the object. After this crossing, a change of the radiance upon crossing another object becomes relatively small. For this reason, a radiance at a small crossing count and a radiance at a large crossing count hardly differ from each other.

To the contrary, a ray having a wavelength at which the reflectance of an object is high hardly attenuates the radiance even upon crossing the object. After this crossing, a change of the radiance upon crossing another object may become relatively large. A radiance at a small crossing count and a radiance at a large crossing count may greatly differ from each other. Noise may occur unless this is considered. This characteristic also applies to a ray passing through an object.

From this, the second embodiment sets the maximum crossing count $M(\lambda)$ to be large if the reflectance or transmittance is high for an object (to be referred to as the first crossing object hereinafter) first crossing a ray having a given wavelength, and small if it is low. The radiance of a light source is directly reflected in a radiance after a crossing, and thus is taken into consideration when setting the maximum crossing count $M(\lambda)$. More specifically, as the intensity of a ray remaining after crossing the first crossing object is higher, the maximum crossing count $M(\lambda)$ is set to be larger. In this way, the maximum crossing count $M(\lambda)$ is set in accordance with the radiance of a light source and the spectral characteristics (reflection property or transmission property) of an object. The calculation amount can be reduced while suppressing generation of noise.

A concept of a method of setting the maximum crossing count $M(\lambda)$ especially for a component reflected by an object will be explained with reference to FIG. 14. When an object crossing a ray at a given incident angle and exit angle has a spectral reflectance shown in FIG. 14, the maximum crossing count $M(480)$ is set to be large at a wavelength of, for example, 480 nm at which the reflectance is high. In contrast, the maximum crossing count $M(680)$ is set to be small at a wavelength of, for example, 680 nm at which the reflectance is low.

More specifically, the maximum crossing counts $M_r(\lambda)$ and $M_t(\lambda)$ of reflected light and transmitted light with respect to an object are respectively given by $$M_r(\lambda)=g\{M(\lambda),f_r(x,\omega_i,\lambda,\omega_r),S(\lambda)\} \quad (14)$$

$$M_t(\lambda)=g\{M(\lambda),f_t(x,\omega_i,\lambda,\omega_r),S(\lambda)\} \quad (15)$$

Equations (14) and (15) represent the maximum crossing counts $M_r(\lambda)$ and $M_t(\lambda)$ as functions g of the maximum crossing count $M(\lambda)$ initialized in step S406, the spectral characteristics $f_r$ and $f_t$ given by equations (2) and (3), and the spectral radiance $S(\lambda)$ of a light source.

Note that the function g suffices to be a function which increases the maximum crossing count $M(\lambda)$ at a wavelength at which the reflectance or transmittance is high. For example, functions as represented by equations (16) and (17) can be used:

$$g\{M(\lambda),f_r(x,\omega_i,\lambda,\omega_r),S(\lambda)\}=M(\lambda)\times f_r(x,\omega_i,\lambda,\omega_r)\times S(\lambda) \quad (16)$$

$$g\{M(\lambda),f_t(x,\omega_i,\lambda,\omega_t),S(\lambda)\}=M(\lambda)\times\sqrt{\{f_t(x,\omega_i,\lambda,\omega_t)\times S(\lambda)\}} \quad (17)$$

Figure 13:
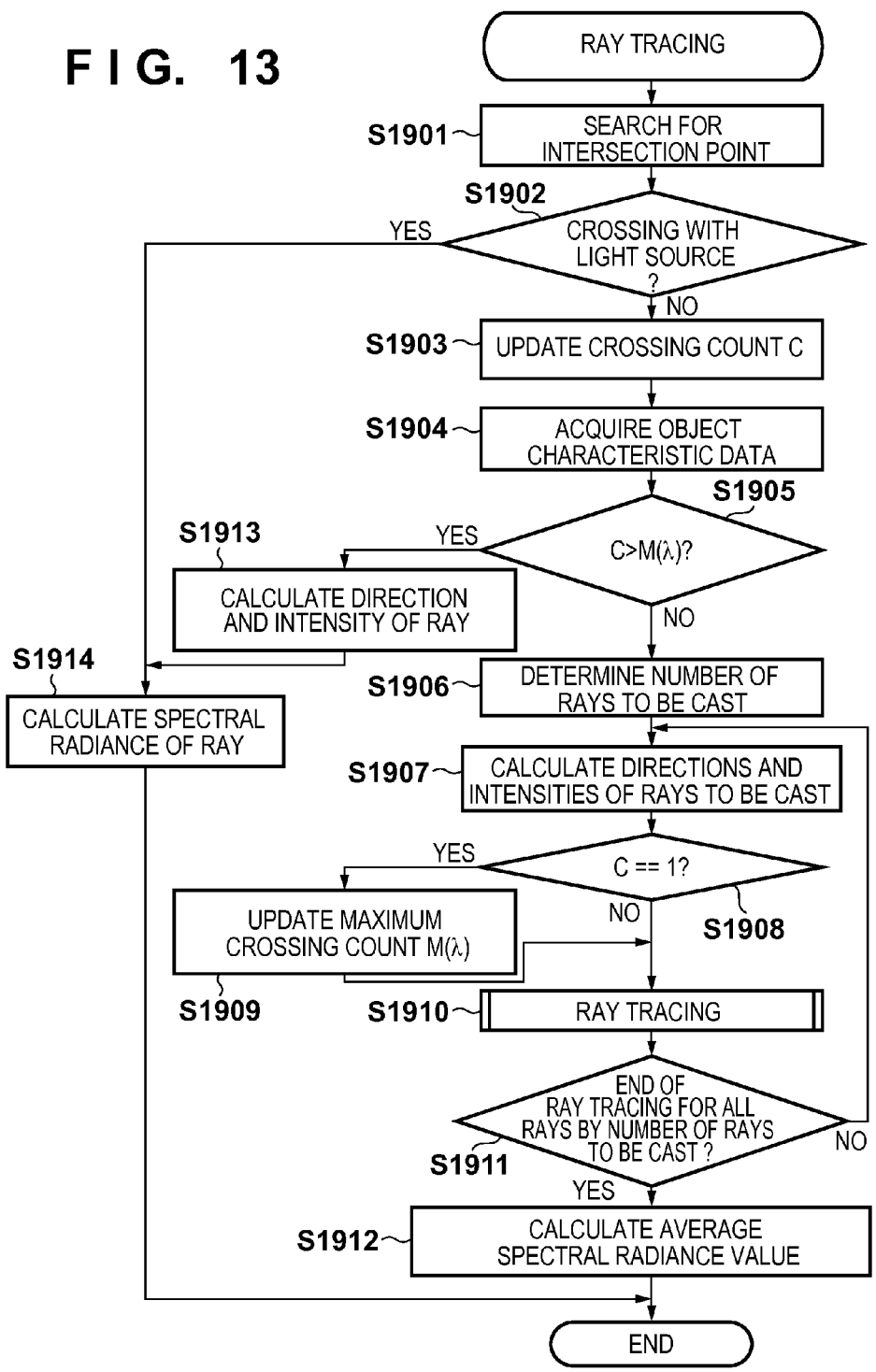
FIG. 13 is a flowchart showing spectral radiance calculation processing in the second embodiment.

In step S1910, ray tracing is performed for the ray by recursively invoking ray tracing shown in FIG. 13. The processing in step S1910 ends when no crossing object remains finally in recursive processing, or the crossing count C of the ray and objects exceeds the maximum crossing count $M_r(\lambda)$ or $M_t(\lambda)$, and a spectral radiance for the ray is calculated in step S1914. In other words, the spectral radiance $E_0(\lambda)$ finally calculated according to equation (4) in the recursive processing of step S1910 becomes a spectral radiance $E_n(\lambda)$ for the ray.

If it is determined in step S1911 that the processes in steps S1907 to S1910 have ended for all rays by the number N of rays to be cast, the average of the spectral radiances $E_n(\lambda)$ of the respective rays is calculated (S1912). The average spectral radiance value serves as a spectral radiance $E_x(\lambda)$ at the tracing target wavelength $\lambda$ in the pixel of interest.

If the crossing count C has exceeded the maximum crossing count $M(\lambda)$ in step S1905 ($C>M(\lambda)$), the direction and intensity of a ray when aborting ray tracing are calculated (S1913). More specifically, the direction of a light source from an intersection point is set as the direction of the ray. The intensity $P(\lambda)$ of the ray is set to 0 when another object exists on a straight line extending from the intersection point to the light source. When no other object exists, only the reflected component is considered in accordance with equation (18):

$$P(\lambda)=P_0(\lambda)\times f_r(x,\omega_i,\lambda,\omega_r) \quad (18)$$

where $P_0(\lambda)$ is the intensity of a ray before crossing an object at the wavelength $\lambda$, and $f_r$ is the reflection property of the object given by equation (2).

After that, the spectral radiance $E_0(\lambda)$ for the wavelength $\lambda$ is calculated according to equation (4) (S1914), ending ray tracing for this wavelength. In calculation of step S1914, the intensity $P(\lambda)$ of the ray that has been calculated in step S1913, and the light distribution characteristic $Q(\theta)$ and spectral radiance $S(\lambda)$ of the light source are applied.

As described above, when performing spectral ray tracing, the crossing count is restricted for each wavelength of a ray in consideration of the radiance of a light source and the spectral characteristics of an object. Calculation is executed for only a minimum number of crossings at each wavelength. This can increase the calculation speed and reduce noise in a generated image.

Third Embodiment

In the second embodiment, the maximum crossing count is set for each wavelength of a ray in accordance with the radiance of a light source and the spectral properties of an object. The third embodiment increases the calculation speed and reduces noise in a generated image by setting the number of rays to be cast for each wavelength in accordance with the spectral properties of an object.

Note that the arrangement of an image processing apparatus in the third embodiment is the same as those shown in FIGS. 2 and 3 in the first embodiment. The same reference numerals denote the same parts, and a description thereof will not be repeated.

Scene CG Image Generation Processing

Image generation processing of generating the CG image of a scene in an image processing apparatus 301 in the third embodiment is the same as the processing shown in FIG. 12 in the second embodiment except for the spectral radiance calculation processing in step S1407.

Spectral Radiance Calculation Processing

Spectral radiance calculation processing (S1407) in the third embodiment will be explained in detail with reference to FIG. 15. Even in the third embodiment, a plurality of rays are traced by recursively executing ray tracing shown in the flowchart of FIG. 15, and a spectral radiance in the pixel of interest is calculated from the average of spectral radiances calculated for respective rays.

Spectral radiance calculation processing for monochromatic light having the wavelength $\lambda$ will be explained with reference to FIG. 15. A spectral radiance in the pixel of interest is actually obtained by executing the same processing for each wavelength, similar to the first and second embodiments.

Figure 15:
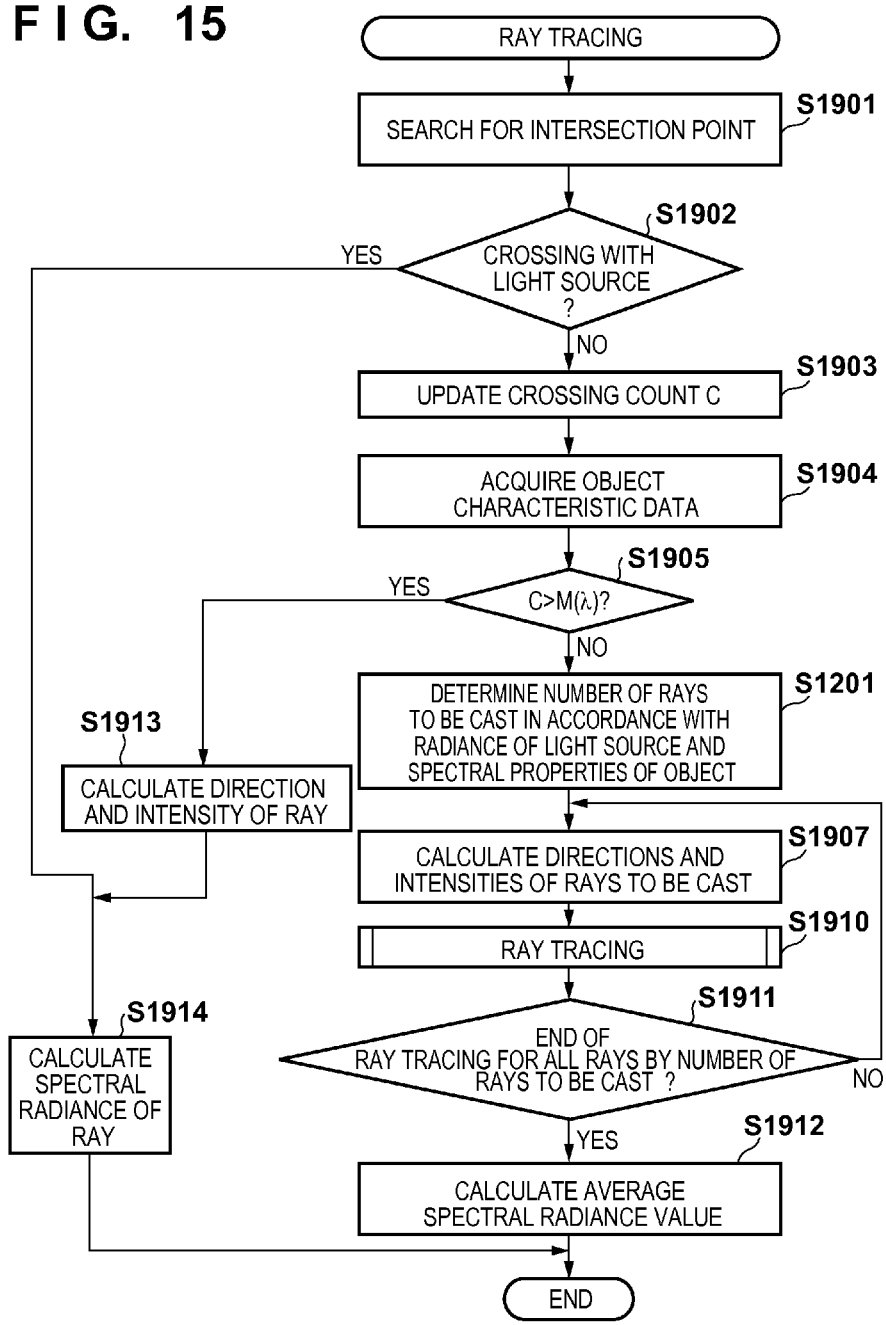
FIG. 15 is a flowchart showing spectral radiance calculation processing in the third embodiment.

In FIG. 15, processes except for processing (S1201) of determining the number N of rays to be cast are the same as those in shown in FIG. 13 in the second embodiment.

The third embodiment also uses the maximum crossing count $M(\lambda)$ which is initialized in step S1406, similar to the second embodiment. However, the maximum crossing count $M(\lambda)$ is fixed and is not updated regardless of the first crossing object. In other words, processes in steps S1908 and S1909 contained in the processing of FIG. 13 are not included in the processing of FIG. 15.

Determination of the number N of rays to be cast in accordance with the spectral properties of an object in processing (S1201) of determining the number N of rays to be cast in the third embodiment will be explained.

As described in the second embodiment, a ray having a wavelength at which the reflectance or transmittance of an object is low greatly changes the radiance upon crossing the object. A change of the radiance upon crossing another object becomes relatively small. For this reason, a radiance obtained when the number of rays to be newly cast from the intersection point is small, and a radiance obtained when it is large are hardly different.

In contrast, a ray having a wavelength at which the reflectance or transmittance of an object is high hardly changes the radiance even upon crossing the object. A change of the radiance upon crossing another object may become relatively large. Thus, a radiance obtained when the number of rays to be newly cast is small, and a radiance obtained when it is large may become greatly different. Noise may occur unless this is considered.

For each object crossing a ray having a given wavelength, the third embodiment sets the number $N(\lambda)$ of rays to be cast, to be large if the reflectance or transmittance of the object is high, and small if it is low. Similar to the second embodiment, the radiance of a light source should be considered when setting the number $N(\lambda)$ of rays to be cast. More specifically, as the intensity of a ray remaining after crossing an object is higher, the number $N(\lambda)$ of rays to be cast is set to be larger. In this fashion, the number $N(\lambda)$ of rays to be cast is set in accordance with the radiance of a light source and the spectral properties (reflection property or transmission property) of an object. The calculation amount can be reduced while suppressing generation of noise.

Figure 16:
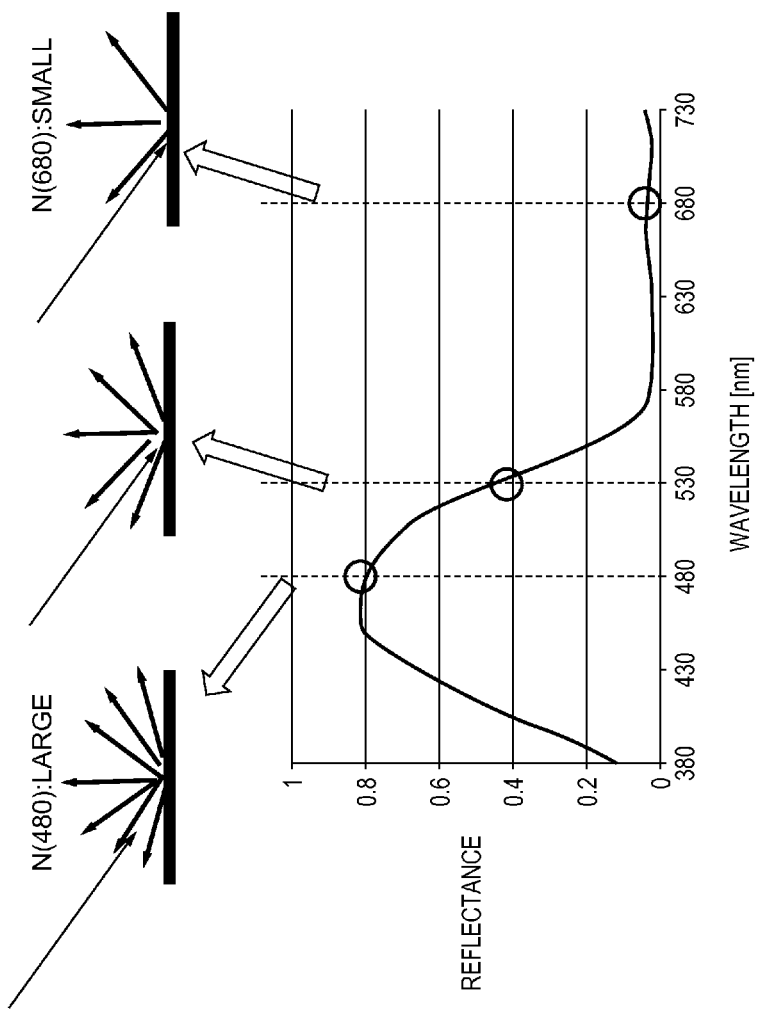
FIG. 16 is a graph showing a concept of a method of setting the number of rays to be cast in ray tracing in the third embodiment.

A concept of a method of setting the number $N(\lambda)$ of rays to be cast especially for a component reflected by an object will be explained with reference to FIG. 16. When an object crossing a ray at a given incident angle and exit angle has a spectral reflectance shown in FIG. 16, the number N(480) of rays to be cast is set to be large at a wavelength of, for example, 480 nm at which the reflectance is high. In contrast, the number N(680) of rays to be cast is set to be small at a wavelength of, for example, 680 nm at which the reflectance is low.

More specifically, the numbers $N_r(\lambda)$ and $N_t(\lambda)$ of rays to be cast for reflected light and transmitted light with respect to an object are respectively given as functions h of the spectral properties $f_r$ and $f_t$ given by equations (2) and (3), and the spectral radiance $S(\lambda)$ of a light source:

$$N_r(\lambda)=h\{f_r(x,\omega_i,\lambda,\omega_r),S(\lambda)\} \quad (19)$$

$$N_t(\lambda)=h\{f_t(x,\omega_i,\lambda,\omega_t),S(\lambda)\} \quad (20)$$

Note that the function h suffices to be a function which increases the number $N(\lambda)$ of rays to be cast at a wavelength at which the reflectance is high. For example, functions as represented by equations (21) and (22) can be used:

$$h\{f_r(x,\omega_i,\lambda,\omega_r),S(\lambda)\}=R{\max}\times f_r(x,\omega_i,\lambda,\omega_r)\times S(\lambda) \quad (21)$$

$$h\{f_t(x,\omega_i,\lambda,\omega_t),S(\lambda)\}=R{\max}\times\sqrt{\{f_t(x,\omega_i,\lambda,\omega_t)\times S(\lambda)\}} \quad (22)$$

In equations (21) and (22), Rmax is a constant having an arbitrary value, and is the number of rays to be cast when the reflectance or transmittance is 1. As Rmax increases, an image with less noise is obtained, but the calculation amount increases.

In the third embodiment, new rays are cast from an intersection point by the number $N(\lambda)$ of rays to be cast that is set in accordance with the radiance of a light source and the spectral properties of an object. By repetitively tracing the ray path, a radiance in the pixel of interest is calculated.

As described above, when performing spectral ray tracing, the number $N(\lambda)$ of rays to be cast is set by taking account of the radiance of a light source and the spectral properties of an object. Calculation is executed for only a minimum number of rays at each wavelength. This can increase the calculation speed and reduce noise in a generated image.

Note that the processing in the third embodiment can also be executed at the same time as that in the second embodiment. The maximum crossing count $M(\lambda)$ and the number $N(\lambda)$ of rays to be cast suffice to be set for each wavelength of a ray in accordance with the radiance of a light source and the spectral properties of an object.

Modification of Second and Third Embodiments

In the second and third embodiments, the radiance of a light source and the reflection property and transmission property of an object have wavelength dependence, and these properties have spectral properties. However, the present invention is not limited to an application to ray tracing using spectral information, and is also applicable to ray tracing for one color having only density information, or ray tracing for three, R, G, and B colors. In this case, when the reflection property or transmission property of an object is low, the number of rays to be cast or the maximum crossing count is set to be small, increasing the processing speed. When the reflection property or transmission property of an object is high, the number of rays to be cast or the maximum crossing count is set to be large, giving priority to noise reduction rather than an increase in processing speed.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-202333, filed Sep. 15, 2011, which is hereby incorporated by reference herein in its entirety.

What is claimed is:

1. An image processing apparatus for generating a computer graphics image, comprising:
a first input section configured to input light source characteristic data representing a spectral characteristic and light distribution characteristic of at least one light source which illuminates a scene;
a second input section configured to input object characteristic data representing a spectral property of at least one object contained in the scene;
a trace section configured to perform ray tracing for respective rays having different wavelengths, and calculate a spectral radiance in each pixel of a computer graphics image which represents the scene based on the light source characteristic data and the object characteristic data; and
a generator configured to calculate color signal values of each pixel from the spectral radiance in the each pixel, and generate the computer graphics image of the scene,
wherein the trace section sets a maximum crossing count for each of at least two wavelengths of rays to be traced based on reflectance or transmittance at each wavelength indicated by the object characteristic data of an object first crossing the rays and wavelengths of the rays indicated by the light source characteristic data, and performs the ray tracing in each of the at least two wavelengths of rays to be traced so that a crossing count of the ray and objects does not exceed the maximum crossing count, and
wherein at least one of the first and second input sections, the trace section, and the generator is implemented using a processor.

2. The apparatus according to claim 1, wherein the trace section sets the maximum crossing count for a wavelength at which the reflectance or transmittance of the first crossing object is high to be larger than the maximum crossing count for a wavelength at which the reflectance or transmittance of the first crossing object is low.

3. The apparatus according to claim 1, wherein the trace section sets the maximum crossing count for each of a reflected component and transmitted component of the ray with respect to the first crossing object.

4. An image processing apparatus for generating a computer graphics image, comprising:
a first input section configured to input light source characteristic data representing a spectral characteristic and light distribution characteristic of at least one light source which illuminates a scene;
a second input section configured to input object characteristic data representing a spectral property of at least one object contained in the scene;
a trace section configured to perform ray tracing for respective rays having different wavelengths, and calculate a spectral radiance in each pixel of a computer graphics image which represents the scene based on the light source characteristic data and the object characteristic data; and
a generator configured to calculate color signal values of each pixel from the spectral radiance in the each pixel, and generate the computer graphics image of the scene,
wherein the trace section sets a number of rays for each of the least two wavelengths of rays to be traced from an intersection point between the rays and an object first crossing the rays based on the object characteristic data of the first crossing object and wavelengths of the rays indicated by the light source characteristic data, and then performs the ray tracing, and
wherein at least one of the first and second input sections, the trace section, or the generator is implemented using a processor.

5. The apparatus according to claim 4, wherein the trace section sets the number of rays to be traced for a wavelength at which the reflectance or transmittance of the first crossing object is high to be larger than the number of rays to be traced for a wavelength at which the reflectance or transmittance of the first crossing object is low.

6. The apparatus according to claim 4, wherein the trace section sets the number of rays to be traced for each of a reflected component and transmitted component of the ray with respect to the first crossing object.

7. The apparatus according to claim 1, wherein the light distribution characteristic represents an intensity distribution of light radiated from the light source in an arbitrary direction.

8. The apparatus according to claim 1, wherein the spectral characteristic of the object includes a spectral reflection property, spectral transmission property, and spectral refractive index of the object.

9. The apparatus according to claim 8, wherein the spectral reflection property comprises a bidirectional reflectance distribution function of the object.

10. The apparatus according to claim 8, wherein the spectral transmission property comprises a bidirectional transmittance distribution function of the object.

11. An image processing method of generating a computer graphics image, comprising:
using a processor to perform steps of:
inputting light source characteristic data representing a spectral characteristic and light distribution characteristic of at least one light source which illuminates a scene;
inputting object characteristic data representing a spectral property of at least one object contained in the scene;
performing ray tracing for respective rays having different wavelengths to calculate a spectral radiance in each pixel of a computer graphics image which represents the scene based on the light source characteristic data and the object characteristic data; and
calculating color signal values of each pixel from the spectral radiance in the each pixel to generate the computer graphics image of the scene,
wherein, in the performing step, a maximum crossing count is set for each of at least two wavelengths of rays to be traced based on reflectance or transmittance at each wavelength indicated by the object characteristic data of an object first crossing the rays and wavelengths of the rays indicated by the light source characteristic data, and the ray tracing is performed in each of the at least two wavelengths of rays to be traced so that a crossing count of the ray and objects does not exceed the maximum crossing count.

12. A non-transitory computer readable medium storing a computer-executable program for causing a computer to perform an image processing method of generating a computer graphics image, the method comprising steps of:
inputting light source characteristic data representing a spectral characteristic and light distribution characteristic of at least one light source which illuminates a scene;
inputting object characteristic data representing a spectral property of at least one object contained in the scene;
performing ray tracing for respective rays having different wavelengths to calculate a spectral radiance in each pixel of a computer graphics image which represents the scene based on the light source characteristic data and the object characteristic data; and calculating color signal values of each pixel from the spectral radiance in the each pixel to generate the computer graphics image of the scene, wherein, in the performing step, a maximum crossing count is set for each of at least two wavelengths of rays to be traced based on reflectance or transmittance at each wavelength indicated by the object characteristic data of an object first crossing the rays and wavelengths of the rays indicated by the light source characteristic data, and the ray tracing is performed in each of the at least two wavelengths of rays to be traced so that a crossing count of the ray and objects does not exceed the maximum crossing count.

13. An image processing method of generating a computer graphics image, comprising:

using a processor to perform steps of:

inputting light source characteristic data representing a spectral characteristic and light distribution characteristic of at least one light source which illuminates a scene;

inputting object characteristic data representing a spectral property of at least one object contained in the scene;

performing ray tracing for respective rays having different wavelengths, and calculate a spectral radiance in each pixel of a computer graphics image which represents the scene based on the light source characteristic data and the object characteristic data; and calculating color signal values of each pixel from the spectral radiance in the each pixel to generate the computer graphics image of the scene, wherein, in the performing step, a number of rays is set for each of at least two wavelength of rays to be traced from an intersection point between the rays and an object first crossing the rays based on the object characteristic data of the first crossing object and wavelengths of the rays indicated by the light source characteristic data, and then the ray tracing is performed.

14. A non-transitory computer readable medium storing a computer-executable program for causing a computer to perform an image processing method of generating a computer graphics image, the method comprising the steps of:

inputting light source characteristic data representing a spectral characteristic and light distribution characteristic of at least one light source which illuminates a scene;

inputting object characteristic data representing a spectral property of at least one object contained in the scene;

performing ray tracing for respective rays having different wavelengths, and calculate a spectral radiance in each pixel of a computer graphics image which represents the scene based on the light source characteristic data and the object characteristic data; and calculating color signal values of each pixel from the spectral radiance in the each pixel to generate the computer graphics image of the scene, wherein, in the performing step, a number of rays is set for each of at least two wavelength of rays to be traced from an intersection point between the rays and an object first crossing the rays based on the object characteristic data of the first crossing object and wavelengths of the rays indicated by the light source characteristic data, and then the ray tracing is performed.

* * * * *